Figure 1:
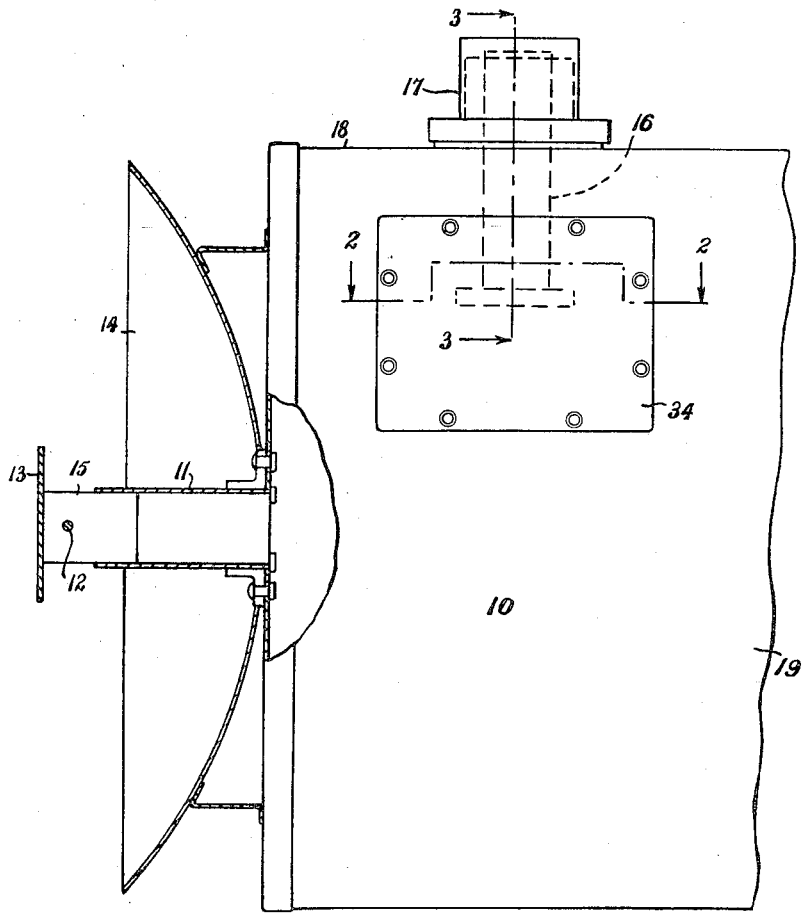

Aug. 10, 1954     A. HARRISON     2,686,303

RESONATOR FOR USE IN MONITORING RADAR EQUIPMENT

Filed Oct. 12, 1949

INVENTOR
Alban Harrison
By Ralph B. Stewart
Attorney

Patented Aug. 10, 1954

UNITED STATES PATENT OFFICE 2,686,303

RESONATOR FOR USE IN MONITORING RADAR EQUIPMENT

Alban Harrison, Barkingside, England, assignor, by mesne assignments, to Kelvin & Hughes Limited, Glasgow, Scotland, a company of Great Britain Application October 12, 1949, Serial No. 120,881

Claims priority, application Great Britain October 20, 1948

6 Claims. (Cl. 343—17.7)

This invention relates to electrical hollow-space resonators for use in monitoring radar equipment.

It has been proposed to use as a monitor for a radar set a hollow resonator, having conducting walls, in combination with an aerial system, the hollow resonator being of such size and shape that it has a considerable number of modes of oscillation in the frequency band occupied by the output pulse from the radar transmitter of the set to be monitored thereby. The pulse transmitted from the radar transmitter on being received by the aerial system of the monitor produces oscillations in the resonator. These oscillations persist after the cessation of the transmitted pulse, decaying more or less exponentially, and part of their energy is re-radiated from the aerial and picked up by the radar receiver. The interval between the transmission of the pulse and the decay of the signal received from the resonator to such a value that it cannot be distinguished at the receiver indicator (usually a cathode ray tube) thus may be used to provide a convenient over-all measure of the performance of the radar set.

However, a resonator of the type previously proposed suffers from a disadvantage which arises from the fact that it has a number of possible modes of oscillation within the frequency-band of the set. There will be a continuous interchange of energy between these modes during the decay of the oscillations within the resonator (an acoustic analogy is provided by the beats which occur between the various modes of oscillation of a ringing bell). The coupling of the various modes with the aerial system varies with the mode, thus superimposing on the predominantly exponential decay of the intensity of the re-radiated energy an irregular variation. If the frequency of the transmitter and the dimensions of the resonator remain unchanged this irregular variation will be repeated consistently with successive pulses. However, a change either in transmitter frequency or in the resonator dimensions (caused for example by a change of temperature) will introduce a change in the irregular variation causing a change in the time period required for decay of the re-radiated signal from the resonator to such a value that it cannot be distinguished at the receiver indicator. This will, therefore, cause the indication of performance to change even though in fact no actual change in performance has taken place.

It is the object of the present invention to provide an improved monitor for a radar set in which the disadvantage referred to above is substantially removed.

According to the present invention, in a monitor for a radar set including a hollow space resonator and an aerial system for picking up energy and feeding it to the resonator and for re-radiating energy from the resonator, the resonator is provided with mechanical means located within the said resonator and adapted to vary in a periodic manner the frequency of the normal modes of electromagnetic oscillation of the said resonator, the range of such frequency variation being greater than the maximum difference between the frequencies of adjacent modes. The possibility of an unreliable monitor indication is then substantially reduced.

The mechanical means conveniently comprise a vibratable metal reed mounted within the resonator cavity close to one of the walls of the said cavity and arranged to vibrate towards and away from this wall. The reed may conveniently be maintained in oscillation by providing it with a soft iron armature arranged to co-operate with a neighbouring A. C.-excited electromagnet. The resonance frequency of the reed is conveniently made twice the frequency of the exciting current.

An embodiment of the invention will now be described by way of example with reference to the accompanying drawing, the embodiment being suitable for use as a monitor for a radar set working on a wavelength of the order of 3 cms.

Figures 2, 3:
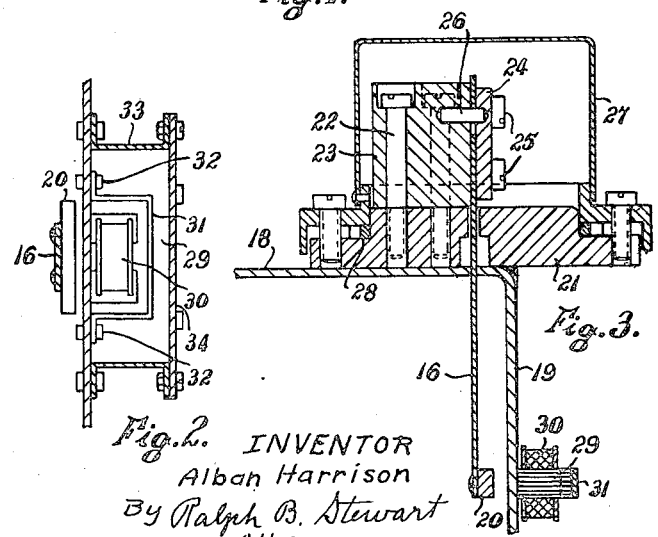

In the drawing Figure 1 is a view in part elevation, partly in section of a part of one embodiment of the invention, Figure 2 is a view in sectional plan on the line 2—2 of Figure 1 of a part of the embodiment of Figure 1, and Figure 3 is a view in sectional elevation on the line 3—3 of Figure 1, to an enlarged scale, of part of the embodiment of Figure 1 with the electromagnet housing removed.

In the drawing the resonator comprises an approximately cubical metal box 10 with sides about 12 inches long. The interior of the box 10 communicates by means of a wave-guide 11 with an aerial system comprising a dipole 12, a reflector plate 13 and a parabolic reflector 14. The plate 13 is a disc fixed to the end of a metal plate 15 fixed to and extending into the mouth of the wave-guide 11 centrally thereof. The dipole 12 is fixed to the plate 15 and extends on either side thereof.

A metal reed 16 which may be of phosphor bronze about 5 inches in length and 1 inch wide is carried by a mount indicated generally by reference 17 in Figure 1 and shown in more detail in Figure 3. The reed 16 has a width comparable with the wavelength of the radar wave received by the aerial system. The reed passes through one wall, in this example the upper wall 18, of the resonator and lies close and parallel to another wall, in this example a side wall 19, of the resonator.

Referring more particularly to Figure 3, the reed carries at its free end an armature 20 of soft iron. The reed mount comprises a base 21 fixed to the wall 18 by means not shown. Fixed to the base 21 by screws 22 is a reed support 23 against which the reed is clamped by a clamping plate 24 and screws 25. A pin 26 passing through an elongated aperture in the reed permits adjustment of the free length of the reed when screws 25 are loosened and prevents the reed falling into the box 10. A detachable cover 27 and sealing ring 28 prevents the entry of moisture through the slot in the wall 18 through which the reed passes.

Referring to Figures 2 and 3, the armature is adapted to be driven by an electromagnet 29 comprising E-shaped stampings and a coil 30 on the centre limb. The electromagnet is clamped to the wall 19 by a strap 31 and bolts 32. A housing for the electromagnet comprises a portion 33 permanently fixed to the wall 19 and a detachable cover 34.

The armature 20 may be spaced from the wall 19 by about a quarter of an inch and the dimensions and weight of the vibratable structure 16, 20 may be such that the mechanical resonance frequency is approximately 100 c./s. Alternating current at a frequency of 50 c./s. may be fed to the coil 30 to set the reed in vibration. By adjustment of the mounting for the reed its resonance frequency may be adjusted accurately to twice the A. C. supply frequency so that its oscillations will have a comparatively large amplitude for a relatively small exciting current in the solenoid. The armature 20 is preferably copper plated to reduce losses.

It is important that the box 10 should be sealed from the atmosphere and that sharp angles and corners within the box should be avoided as far as possible, for example by running solder into the angles and corners.

Where screws or bolts pass through a wall of the box (for example as at 32 in Figure 2), use may be made of internally-threaded hank bushes which may be soldered to the wall to provide a good seal. A suitable sealing compound may be used in known manner to seal the threads of the screws or bolts.

It will be seen that as the reed vibrates the internal reflections in the resonator, and therefore the interchange of energy between the modes, will be varied cyclically in a continuous manner over a considerable range. The time taken for the re-radiated signal to decay to the value at which it cannot be distinguished at the radar receiver will thus vary from pulse to pulse, but the average time of decay will be substantially unaffected by either variations in transmitter frequency or variations in the dimensions of the resonator, and will only be affected by a variation in actual performance.

I claim:
1. A monitor for a radar set comprising a hollow space resonator having dimensions which are large by comparison with the operating wavelength of said radar set, an aerial system for picking up energy from a radar set, means to apply said energy to said resonator and from said resonator to said aerial system, and within said resonator a vibratable electrically conducting reed having a width comparable with the resonance wave-length of said aerial system, said reed varying the frequency of the normal modes of electromagnetic oscillation of said resonator, the range of such variation being greater than the maximum difference between the frequencies of adjacent modes.

2. A monitor for a radar set comprising a hollow space resonator having dimensions which are large by comparison with the operating wavelength of said radar set, an aerial system for picking up energy from a radar set, means to apply said energy to said resonator and from said resonator to said aerial system, a metal reed within said resonator close to a wall thereof and positioned to vibrate towards and away from said wall and electromagnetic means located outside said wall to set said reed in vibration, said metal reed presenting an area to said wall of only a small fraction of the area of said wall and varying the frequency of the normal modes of electromagnetic oscillation of said resonator, the range of such variation being greater than the maximum difference between the frequencies of adjacent modes.

3. A monitor according to claim 2, wherein said reed is mounted upon a support outside said resonator and projects through a wall of said resonator.

4. A monitor for a radar set comprising a hollow space resonator having dimensions which are large by comparison with the operating wavelength of said radar set, an aerial system for picking up energy from a radar set, means to apply said energy to said resonator and from said resonator to said aerial system, a vibratable conducting member located within said resonator close to a wall thereof and positioned to vibrate towards and away from said wall and means located outside said resonator to set said member in vibration, said vibratable conducting member presenting an area to said wall of only a small fraction of the area of said wall and serving to vary the frequency of the normal modes of electromagnetic oscillation of said resonator, the range of such variation being greater than the maximum difference between the frequencies of adjacent modes.

5. A monitor for a radar set according to claim 2 and including means for energizing said electromagnetic means to vibrate said reed continuously at a frequency of the order of 100 cycles per second.

6. A monitor for a radar set comprising a hollow space resonator having a number of different modes of electromagnetic oscillation, an aerial system for picking up energy from a radar set, means to apply said energy to said resonator and from said resonator to said aerial system, and vibratable means mounted within said resonator and adjacent a wall thereof, said vibratable means presenting a vibrating area to said wall of only a small fraction of the area of said wall and varying the frequency of the normal modes of electromagnetic oscillation of said resonator, the range of such variation being greater than the maximum difference between the frequencies of adjacent modes.

References Cited in the file of this patent

UNITED STATES PATENTS

| Number | Name | Date |
| --- | --- | --- |
| 2,414,456 | Edson | Jan. 21, 1947 |
| 2,433,868 | Sensiper | Jan. 6, 1948 |
| 2,436,640 | Fredholm et al. | Feb. 24, 1948 |
| 2,449,451 | Cassen | Sept. 14, 1948 |
| 2,461,005 | Southworth | Feb. 8, 1949 |
| 2,510,299 | Schramm | June 6, 1950 |
| 2,520,604 | Linder | Aug. 29, 1950 |

OTHER REFERENCES

Physical Review, volume 70, Numbers 5 and 6, pages 300, 301, and 302.